No. 641,968. Patented Jan. 23, 1900.
O. B. JACOBS.
GATE.
(Application filed June 2, 1899.)
(No Model.)
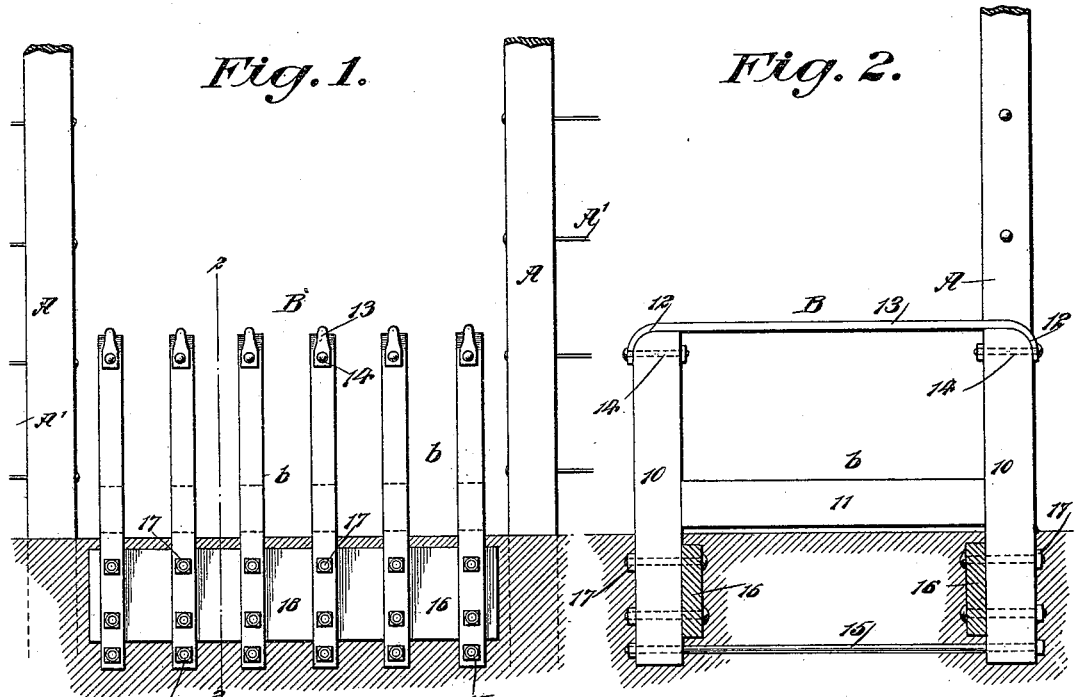
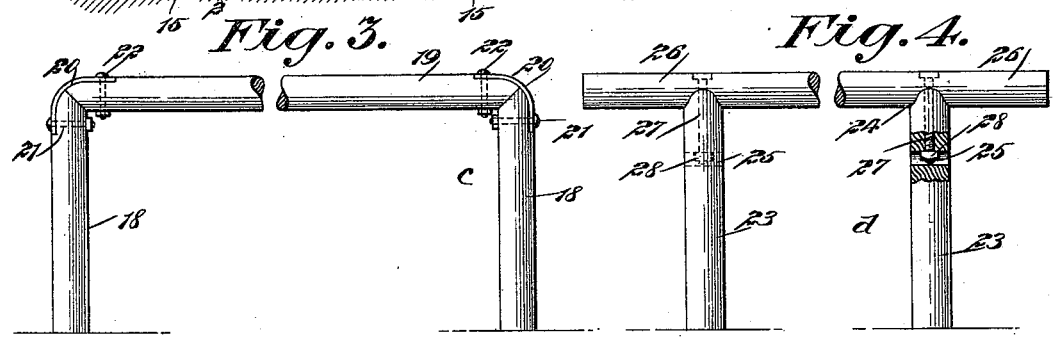
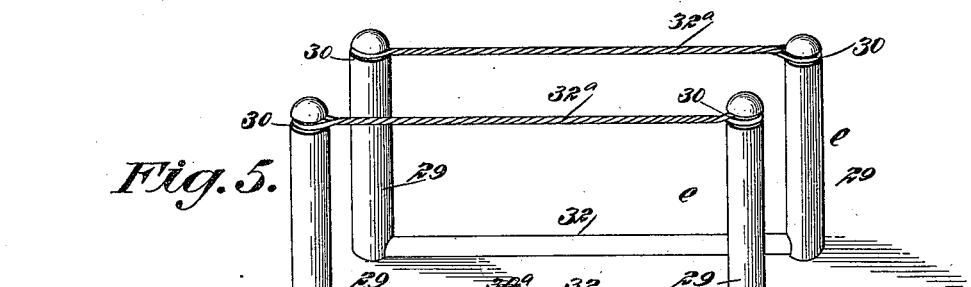
WITNESSES:
INVENTOR
O. B. Jacobs
BY
ATTORNEYS
THE NORRIS PETERS CO., PHOTO-LITHO., WASHINGTON, D. C.

UNITED STATES PATENT OFFICE.

OLAUS B. JACOBS, OF ROLAND, IOWA.

GATE.

SPECIFICATION forming part of Letters Patent No. 641,968, dated January 23, 1900.

Application filed June 2, 1899. Serial No. 719,126. (No model.)

*To all whom it may concern:*

Be it known that I, OLAUS B. JACOBS, of Roland, in the county of Story and State of Iowa, have invented a new and useful Improvement in Gates, of which the following is a full, clear, and exact description.

The object of my invention is to provide a simple, durable, and convenient form of gateway especially designed to confine hogs and sheep in inclosures where they are allowed to run with cattle and to so construct the gateway that while it will effectually confine hogs within desired limits horses and cattle will be free to pass in and out.

Another object of the invention is to provide a gateway that will not require attention and which will not injure stock.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the improved gateway. Fig. 2 is a side elevation of one of the members or sections of the gateway, the connecting-plates for the various sections of said gateway being in transverse section and the section being taken practically on the line 2 2 of Fig. 1. Fig. 3 is a side elevation of a portion of a section of the gateway, showing a slight modification in the construction of the sections. Fig. 4 is a side elevation of a portion of a gateway, showing another modification in its construction, a part of one of the uprights or posts being broken away; and Fig. 5 is a perspective view of two sections of a gateway, illustrating another slight modification in the construction of said sections.

A represents the end posts of fence-panels A', between which posts the improved gateway B is placed. A number of sections *b* are employed in the formation of the gateway, and these sections are arranged parallel to each other and are spaced a sufficient distance apart to form passage-ways capable of receiving a foot and the lower portion of the leg of such animals as horses, cattle, calves, &c. The sections are so arranged that they are at right angles to the opening between the posts A, and one end of each section is preferably fixed in alinement with the inner surfaces of the said posts A, as shown best in Fig. 2. The sections *b* extend a sufficient distance above the ground to form a barrier to small animals, such as sheep and hogs, the sections being higher than the usual length of the legs of such animals and it being impossible for the animals to crowd their bodies into the passage-ways between the sections.

Under the construction of the sections of the gateway shown in Figs. 1 and 2 each section consists of two alining end posts 10, connected about midway between their tops and bottoms by a cross-bar 11. These posts 10 may be made of dressed or of undressed lumber and may be given any desired cross-sectional shape. In Figs. 1 and 2 they are illustrated as made of dressed lumber and as provided with flat side faces. Each post 10 is provided with a rounded surface 12 at its upper outer corner, and a bar or strap 13, of wood or metal, extends from the top portion of one post 10 to the top portion of the opposing post. The ends of the strap or bar 13 are bent to conform to the upper contour of said posts, especially at their outer edges, and extend downward along the said outer edges of the posts a desired distance. The bar or strap 13 is secured to the posts 10 of a section *b* through the medium of bolts 14 or their equivalents, that are passed through the end portions of the strap or bar and horizontally through the posts. The posts 10 of each section *b* are connected at their lower ends by a suitably-constructed rod 15, and preferably all of the sections *b* are firmly connected by plates or cross-bars 16, that engage with the inner faces of the end posts, both at the front and at the rear of the sections, these plates 16 being secured to the posts of the sections by bolts 17 or by like devices. When the sections are placed in the ground, the connecting-plates 16 are beneath the surface of the ground and the cross-bars 11 of the sections are brought quite close to the ground or in engagement therewith.

In Fig. 3 the section *c* presented differs slightly in construction from the sections just described. The section *c* consists of posts 18, that may be logs or may have any cross-sectional shape, and these posts 18 are connected at their upper ends by a miter-joint with the extremities of a top bar 19, which although shown round in cross-section may be otherwise formed. The upper outer corners of the posts 18 and top bar 19 are rounded off, and the top bar and posts are firmly secured together by straps 20, shaped to the said rounded corners of the parts, securing the straps at one end to the posts 18 by horizontal bolts or rivets 21, and securing the opposite end of the straps to the top bar 19 by vertical bolts or rivets 22.

The section $d$ (shown in Fig. 4) presents a slight structural deviation from the sections previously described; inasmuch as each section $d$ consists of any desired number of posts 23, each of said posts having a concavity 24 in its upper end, a horizontal opening 25 adjacent to its upper end, and a bore extending from the transverse opening 25 out through the central portion of the upper end of the post. A top bar 26, preferably circular in cross-section, is fitted in the concavities at the upper ends of the posts 23 of a section, and the top bar 26 preferably extends beyond the end posts of the section. The posts and top bars are firmly tied together by bolts 27, passed through the top bar and through the bores in the said posts 23, nuts 28 being screwed upon said bolts at the apertures or openings 25.

In the form of the section $e$ (shown in Fig. 5) each section consists of posts 29, having annular grooves 30 near their upper ends, which are round, and annular grooves 31 near their lower ends, and the posts of a section are connected and braced by a central cross-bar 32, corresponding to the bar 11. (Shown in Fig. 2.) A cable $32^a$ is provided having a loop at each of its ends, and the loops of this cable are passed over the upper ends of the posts 29 to an engagement with the recessed surfaces 30 of said posts. An endless cable 33 is then placed in engagement with the recessed portions 31 at the bottom of said posts 29 and a stick or a bar 34 is passed between the strands of the cable 33. The said cable is then twisted until the lower ends of the posts are firmly braced, whereupon the free end of the bar or stick 34 is made to engage with a side of the cross-bar 32.

When a section is constructed as shown in Fig. 5, it is buried in the ground up to its cross-bar 32. When the sections are constructed as shown in Figs. 3 and 4, the posts may be driven into the ground or may be otherwise anchored or fixed therein. In the formation of a gateway from sections of either form they are arranged as shown in Figs. 1 and 2.

Having thus described my invention, I claim as new and desire to secure by Letters Patent—

1. A gateway having a plurality of parallel partitions arranged therein and at an angle thereto, to form uninterrupted passage-ways, the said partitions being of a height and spaced apart such a distance that long-legged animals can pass through the gateway, while short-legged animals are effectually prevented from passing through the same, as set forth.

2. A gateway having a series of parallel partitions of sufficient height to prevent the passage of small stock, rising between the sides of the gateway-opening at an angle to a line drawn across said opening, and continuous passage-ways between the partitions of sufficient width to receive an animal's leg, as described.

3. A gateway having a series of parallel and spaced partitions arranged therein and at an angle thereto, the partitions having unbroken upper surfaces and so placed and arranged that short-legged animals are prevented from passing through the gateway, while long-legged animals can freely pass, substantially as described.

4. A partition for gateways, consisting of posts having concave upper ends, horizontal openings adjacent to the concaved ends, and bores extending from said openings through the posts at their concaved ends, and a top bar fitted into the concaved end portions of the posts, bolts passed through the top bar and through the bores in the posts, and locking devices for said posts located in the horizontal openings in said posts, for the purpose described.

5. A gateway having a series of parallel and spaced partitions arranged in and at right angles thereto, the partitions being of sufficient height to prevent the passage of small stock, each partition being formed of posts spaced apart and connected together, substantially as described.

OLAUS B. JACOBS.

Witnesses:
O. B. PETERSON,
ALEX. HENDERSON.